Nov. 8, 1960 J. L. JENSEN 2,959,726

SEMICONDUCTOR APPARATUS

Filed Oct. 8, 1958 3 Sheets-Sheet 1

INVENTOR.
JAMES LEE JENSEN

BY Osmund R. Dahle

ATTORNEY

Nov. 8, 1960 J. L. JENSEN 2,959,726

SEMICONDUCTOR APPARATUS

Filed Oct. 8, 1958 3 Sheets-Sheet 2

INVENTOR.
JAMES LEE JENSEN

BY Omund R. Dahle

ATTORNEY

INVENTOR.
JAMES LEE JENSEN
BY Omund R. Dahle
ATTORNEY

United States Patent Office 2,959,726

Patented Nov. 8, 1960

2,959,726

SEMICONDUCTOR APPARATUS

James Lee Jensen, St. Louis Park, Minn., assignor to Minneapolis-Honeywell Regulator Company, Minneapolis, Minn., a corporation of Delaware Filed Oct. 8, 1958, Ser. No. 766,098

14 Claims. (Cl. 321—18)

This invention relates generally to voltage regulation apparatus and more particularly to apparatus including semiconductor amplifying devices and to the electrical circuits associated with the semiconductor devices for the control of voltage.

An object of the invention is to provide a voltage regulated electrical inverter apparatus for converting a D.C. potential to an A.C. potential by novel circuitry including semiconductor switching devices.

Another object of this invention is to provide a voltage regulated electrical potential inverter circuit in which voltage regulation is accomplished by means of semiconductor switching circuits to provide electronic tap changing on a transformer winding.

Figure 1:
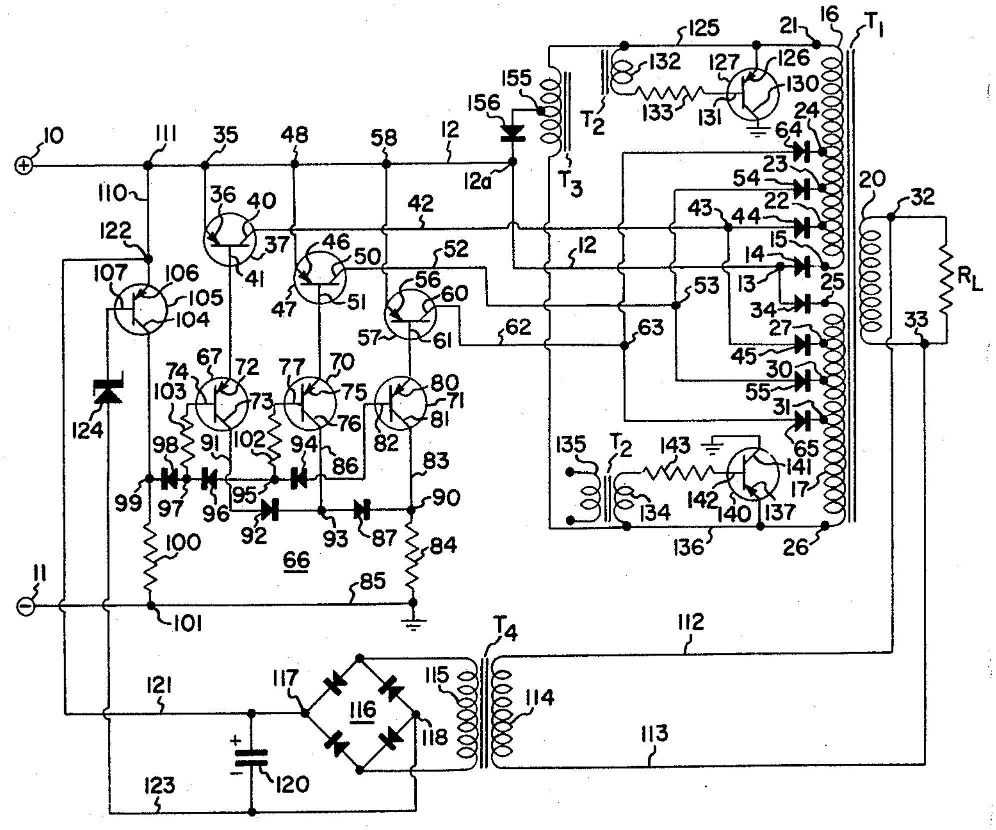
Figure 2:
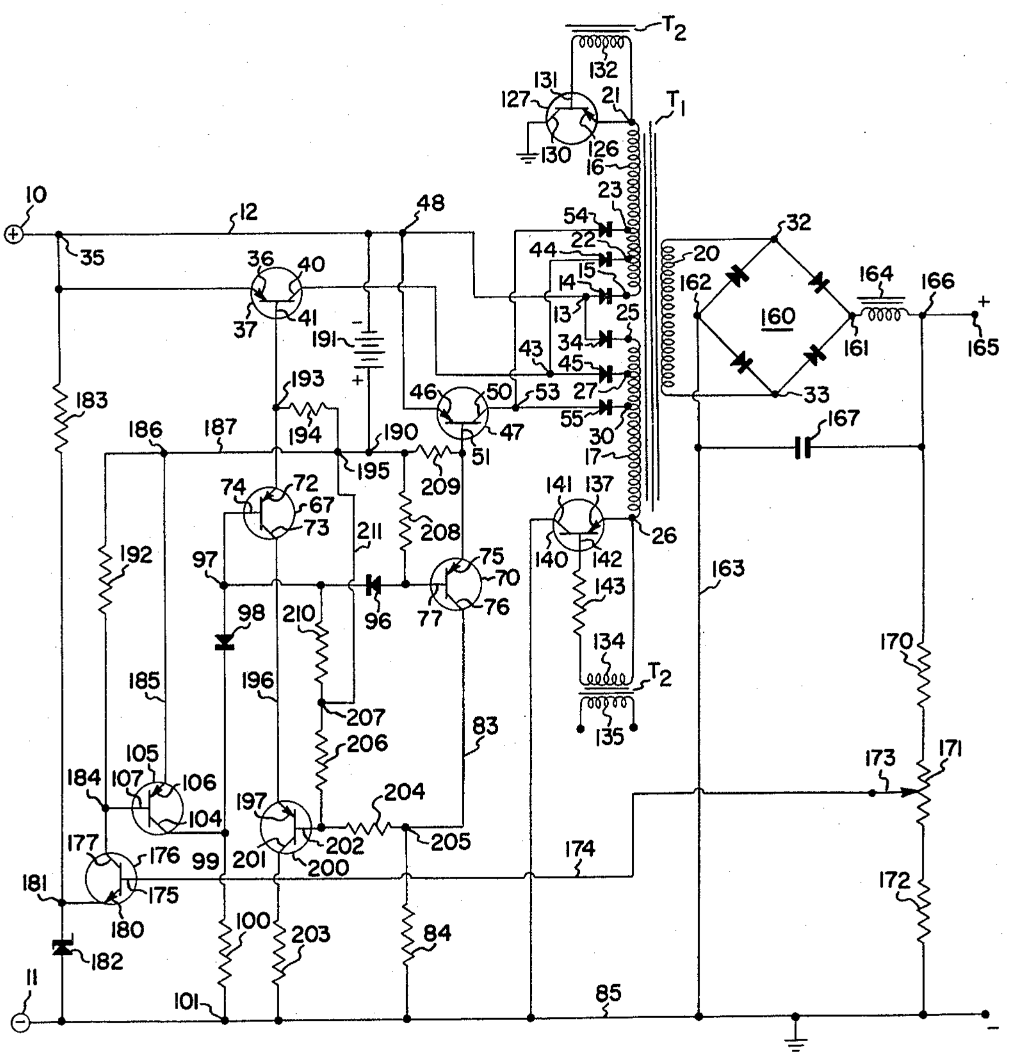
Figures 3, 4:
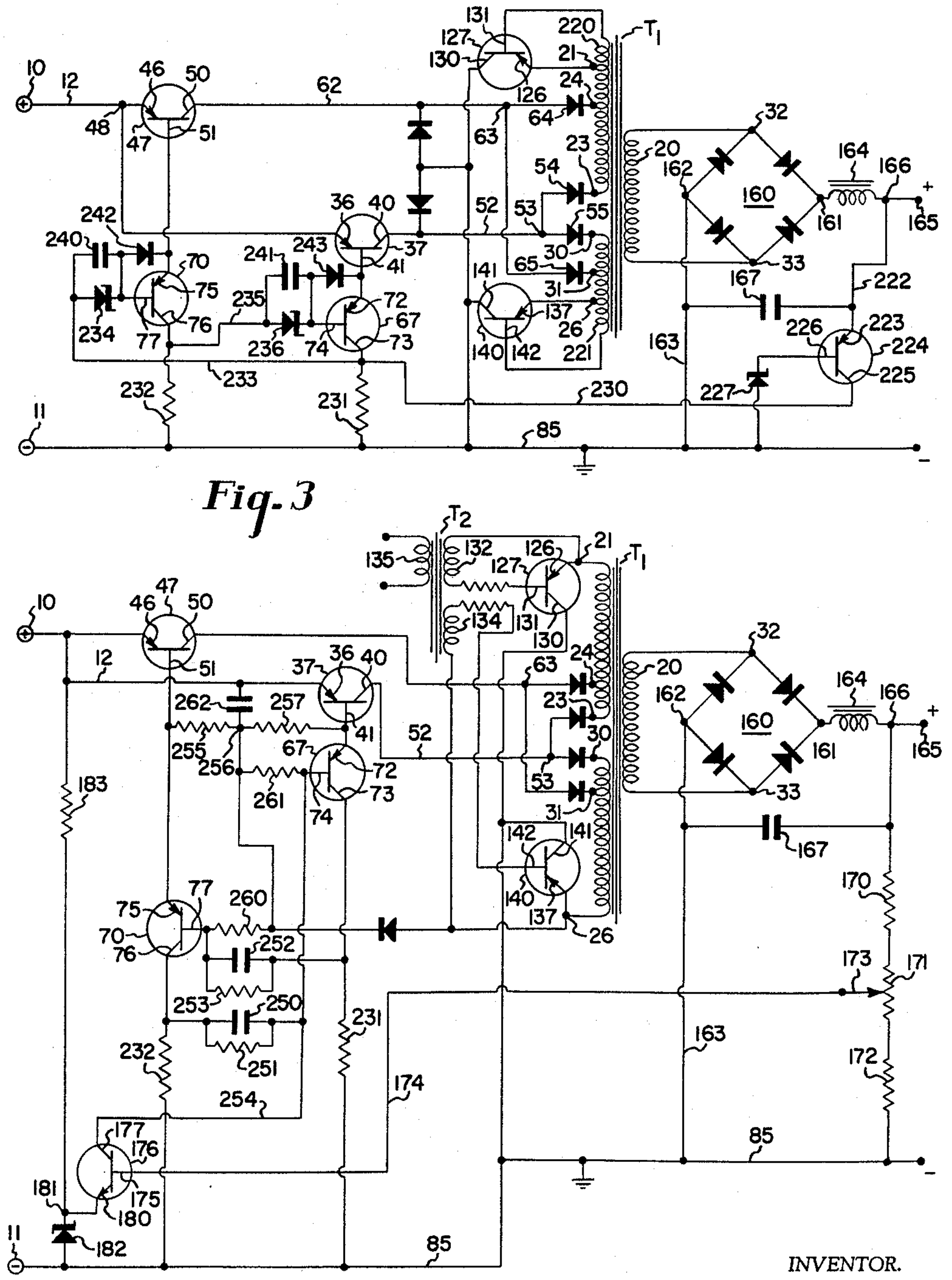

These and other objects of the invention will become more apparent upon consideration of the accompanying specification, claims and drawing of which:

Figures 1, 2, 3 and 4 are schematic representations of the invention, Figures 2, 3 and 4 being modifications of Figure 1.

Referring now to Figure 1, there is disclosed a pair of power input terminals 10 and 11 which are adapted to be energized from a suitable source of D.C. potential (not shown). The positive terminal 10 is connected by means of a conductor 12 through a junction 13 and a rectifier 14 to a terminal 15 of a primary winding 16 of a transformer $T_1$. The rectifier may be of any suitable type, an example of which may be a silicon junction diode. In addition to the primary winding 16, the transformer $T_1$ also includes another primary winding 17 and a secondary winding 20. The primary winding 16, in addition to the end terminal 15, has an opposite end terminal 21 and intermediate taps 22, 23 and 24. The primary winding 17 has end terminals 25 and 26, and intermediate taps 27, 30 and 31. The secondary winding 20 has end terminals 32 and 33 which are connected to energize a suitable load device $R_L$, here shown as a resistive type load.

The positive terminal 10 is also connected by the conductor 12 and the junction 13 and through a rectifier 34 to the end terminal 25 of the winding 17. A junction 35 on the conductor 12 is directly connected to an emitter electrode 36 of a semiconductor amplifying device 37, here shown as a PNP junction type transistor. The transistor 37 also includes a collector electrode 40 and a base electrode 41. The collector electrode 40 is connected by a conductor 42, a junction 43 and a rectifier 44 to the tap 22 on winding 16, and from junction 43 through a rectifier 45 to the tap 27 on winding 17. A junction 48 on the conductor 12 is directly connected to an emitter electrode 46 of a semiconductor amplifying device 47, which may be of the same type as 37. The device 47 includes a collector electrode 50 and a base electrode 51. The collector electrode 50 is connected by a conductor 52, a junction 53 and a rectifier 54 to the tap 23 on winding 16. The collector is also connected by the conductor 52, the junction 53 and a rectifier 55 to the tap 30 on winding 17. A junction

58 on the conductor 12 is directly connected to an emitter electrode 56 of a semiconductor amplifying device 57, which device also includes a collector electrode 60 and a base electrode 61. The collector electrode 60 is connected by a conductor 62, a junction 63 and a rectifier 64 to the tap 24 on winding 16. The collector 60 is also connected by the conductor 62, the junction 63 and the rectifier 65 to the tap 31 on winding 17.

The transistors 37, 47 and 57 are operated as switches by a sequential conducting circuit 66 comprising transistors 67, 70, and 71. The transistor 67 has an emitter electrode 72, a collector electrode 73 and a base electrode 74. The transistor 70 has an emitter electrode 75, a collector electrode 76 and a base electrode 77. The transistor 71 has an emitter electrode 80, a collector electrode 81 and a base electrode 82. The base electrodes 41, 51 and 61 of transistors 37, 47 and 57 are directly connected, respectively, to emitter electrodes 72, 75 and 80. The collector electrode 81 of transistor 71 is connected by means of a conductor 83, a resistor 84 and a conductor 85 to the negative supply terminal 11, the negative conductor 85 being grounded. The collector electrode 76 is connected by a conductor 86 and a rectifier 87 to a junction 90 on the conductor 83. The collector electrode 73 of transistor 67 is connected by a conductor 91 and a rectifier 92 to a junction 93 located on the conductor 86. The base electrode 82 of transistor 71 is connected by a rectifier 94, a junction 95, a rectifier 96, a junction 97, a rectifier 98, a junction 99, and a resistor 100 to a junction 101 on the negative ground conductor 85. The base electrode 77 of transistor 70 is connected by a resistor 102 to the junction 95. The base electrode 74 of transistor 67 is connected by a resistor 103 to the junction 97.

The junction 99 is also connected to a collector electrode 104 of a transistor 105. This latter transistor also includes an emitter electrode 106 and a base electrode 107. The emitter electrode 106 is connected by a conductor 110 to a junction 111 on the positive supply conductor 112. The transistor 105 and the resistor 100 form a controllable voltage divider network across the direct current supply.

The output terminals 32 and 33 of the secondary winding 20 of transformer $T_1$ are connected by conductors 112 and 113 to the primary winding 114 of a transformer $T_4$, the transformer having a secondary winding 115. The secondary winding 115 is connected to the input terminals of a conventional full wave bridge rectifier 116, which rectifier has output terminals 117 and 118. A filter capacitor 120 is connected across the output terminals of the bridge rectifier. The positive terminal 117 is directly connected by a conductor 121 to a junction 122 on the conductor 110 and thus to emitter 106. The negative terminal 118 is connected through a conductor 123 and voltage reference 124, here shown as a Zener diode, to the base electrode 107 of the transistor 105.

The voltage reference diode, known as a Zener diode, is a semiconductor junction rectifier poled so that current flows through it in the reverse or high resistance direction. The Zener voltage or Zener point is the voltage across the rectifying junction associated with that portion of the reverse E vs. I characteristic of a semiconductor junction device when the voltage across the junction remains substantially constant over a considerable range of the current values.

The terminal 21 of winding 16 is connected by a conductor 125 to the emitter electrode 126 of a junction transistor 127. The transistor also includes a collector electrode 130 which is directly connected to ground, and a base electrode 131. The terminal 21 is also connected through the conductor 125 and a primary winding 132 of a transformer $T_2$ and through a resistance 133 to the base electrode 131 of transistor 127. The transformer $T_2$ in addition to the secondary winding 132 also includes another secondary winding 134 and a primary winding 135. The terminal 26 of winding 17 is connected by a conductor 136 to an emitter electrode 137 of a junction transistor 140. The transistor also includes a collector electrode 141 which is directly connected to ground, and a base electrode 142. The terminal 26 is also connected by the conductor 136, the secondary winding 134 of transformer $T_2$ and a resistor 143 to the base electrode 142 of the transistor 140.

*Operation of Figure 1*

In considering the operation of Figure 1 it will be pointed out again that the function of the circuit is to convert a unidirectional source of potential to an alternating current potential which is regulated in magnitude. The transistors 127 and 140, the output transformer $T_1$, the input transformer $T_2$ and the associated circuitry form the potential inverter for converting the D.C. potential to an A.C. potential. The transistors 37, 47, 57, 67, 70 and 71 form a sequential conducting circuit controlled by a feedback from the A.C. output to regulate the voltage to the output by changing the effective turns ratio of the output transformer $T_1$ by tap changing.

Considering the circuit of Figure 1 in further detail, an alternating current potential from any suitable source is applied to primary winding 135 of the transformer $T_2$, the secondary windings 132 and 134 being connected to the input circuits of inverter transistors 127 and 140, respectively. This alternating current voltage, which may be of a sine or square wave type, is effective to alternately and oppositely drive transistors 127 and 140 from a conductive to a relatively non-conductive state. Thus, for example, with a square wave drive when the alternating current potential is of an instantaneous polarity to drive base electrode 131 negative with respect to the emitter 126 and thereby render the transistor 127 conductive, the instantaneous polarity of the potential on winding 134 is such as to drive base electrode 142 positive with respect to the emitter electrode 137 to maintain transistor 140 relatively non-conductive. On the succeeding half cycle of the alternating current potential the conductivity status of the two transistors is reversed.

At this point it should be noted that positive D.C. supply terminal 10 may be selectively connected to the terminal 15 of the winding 16 of transformer $T_1$, or to one of the intermediate taps 22, 23 or 24 depending on the conductivity of the sequential conducting transistors 37, 47 and 57. Likewise, by the same means, the positive supply terminal 10 is connected to the terminal 25 or to the taps 27, 30 or 31 of the winding 17.

Let us assume initial operating conditions such that the inverter transistor 127 is conductive and also such that the transistor 57 is conductive. A current path may be traced from the positive supply terminal 10 through the conductor 12, junction 58, emitter to collector of transistor 57, conductor 62, diode rectifier 64, intermediate tap 24, through the upper portion of winding 16 to terminal 21, and through transistor 127 from emitter to collector to ground. On the succeeding half cycles of the alternating current supply, with the transistor 140 conductive and the transistor 127 non-conductive, the current path may be traced from transistor 57, through the conductor 62, rectifying diode 65, intermediate tap 31, through the lower portion of winding 17 to terminal 26 and through transistor 140 from emitter to collector to ground potential. Thus it can be seen that as the transistors 127 and 140 are alternately rendered conductive, current is caused to flow through winding 16 and then through the winding 17 which results in an alternating current being induced in secondary winding 20 of transformer $T_1$.

The base current path for transistor 57 may be traced from the positive terminal 10 through conductor 12, junction 58, from emitter to base of transistor 57, through the transistor 71 from emitter electrode 80 to collector 81, through conductor 83, junction 90 and through resistor 84 to ground. A current path may also be traced from the emitter electrode 80 of transistor 71 to the base electrode 82 and through the rectifying diodes 94, 96 and 98, junction 99, and through the resistor 100 to ground. During this period the detector transistor 105 is either conducting a relatively small current or a substantially none at all.

Considering again the circuit above discussed, with transistors 57 and 127 conductive, it will be appreciated that the voltage drop across the transistors 57 and 127 and across the rectifying diode 64 are relatively low so that most of the supply potential from terminal 10 appears across the winding 16, with tap 24 being positive with respect to end terminal 21. The voltages induced on the lower portion of the winding 16 are of such a polarity as to make the taps 23, 22 and the terminal 15 positive with respect to the supply line 12, thus back biasing the rectifying diodes 54, 44 and 14 so that no current flows through these circuits. With transistor 57 conductive, the transistors 47 and 37 are also in a conductive state but no collector current flows in these transistors because of the induced potential at taps 23 and 22.

The alternating output potential from secondary winding 20 of output transformer $T_1$ is utilized to energize a suitable load $R_L$, here shown as a resistive type load. The A.C. output potential may be rectified, if desired, and utilized to energize a D.C. load device. The output potential is also fed back through an isolating transformer $T_4$, is rectified by a conventional full wave rectifier 116, the output of which is applied to the control circuit detector transistor 105. The emitter electrode 106 is directly connected to the positive output terminal of the full wave rectifier 116 and the base electrode 107 is connected by means of the voltage reference 124 to the negative terminal of the rectifier. Let us now assume that the output voltage increases to a magnitude at which it is desired to begin regulating. At this point the feedback voltage is sufficient to overcome the reference and the transistor 105 is rendered partially conductive. A current path may then be traced from the positive supply terminal 10 through the transistor 105 from emitter to collector and through the resistor 100 to ground. As the conduction of transistor 105 is increased, a point is reached at which the voltage drop across resistor 100 due to the current flowing in transistor 105 is of a sufficient magnitude to reduce the bias to the base 82 of transistor 71 such that transistor 71 tends to become cutoff or substantially less conductive. As transistor 71 is cutoff the transistor 57 also becomes non-conductive. With transistor 71 non-conductive, the voltage drop across the resistor 84 which was due to the collector current of transistor 71, tends to be reduced. A current path may now be traced in the sequential conducting circuit from the positive supply conductor 10, through conductor 12 to junction 48, from emitter 46 to base 51 of transistor 47, from emitter 75 to collector 76 of transistor 70, through conductor 86, junction 93, diode 87, and through resistor 84 to ground. A base current path for the transistor 70 may be traced from the base 77 through the current limiting resistor 102, junction 95, diodes 96 and 98, and through resistor 100 to ground.

With transistor 47 conductive a current path may be traced from the positive terminal 10 through conductor 12, junction 48, from emitter to collector of transistor 47, through conductor 52, junction 53 and rectifying diode 54 to the tap 23 on winding 16, and on the succeeding half cycle through conductor 52, junction 53 and rectifying diode 55, to intermediate tap 30 on the winding 17. It can be seen that as the current flows through primary winding 16 from tap 23 to terminal 21 and then through transistor 127 to ground, the input current must now flow through more turns of winding 16 whereby the volts per turn of winding 16 is reduced and thereby the volts per turn induced in the secondary winding 20 is likewise reduced. The amount of reduction in voltage on the secondary winding is determined by the difference in turns ratio when the current is caused to flow into tap 23 rather than tap 24 of the primary winding 16.

As long as transistor 47 remains conductive the current flow is alternately in at tap 23 and tap 30 as the transistors 127 and 140 are alternately rendered conductive in the manner described above.

If the D.C. supply potential increases or if for other reasons the A.C. output potential tends to increase still further, the rectified feedback potential at the output of rectifier 116 is increased and causes the detector transistor 105 to become more conductive. The resultant increased current flow through the resistor 100 reduces the bias to transistor 70 and tends to render this transistor non-conductive. Transistor 47, which is controlled by the conductivity of transistor 70, is also rendered non-conductive. Transistor 37 now carries the load current to the inverter, and the current through the transistor 37 is connected through the rectifying diodes 44 and 45 to the taps 22 and 27 of the primary windings 16 and 17 respectively. The base current path for transistor 37 may be traced from the positive terminal 10 through the conductor 12, junction 35, from emitter 36 to base 41 of transistor 37, through transistor 67 from emitter to collector, through diodes 92 and 87, and through resistor 84 to ground. A base current path for the transistor 67 may also be traced from the base 74 through the current limiting resistor 103 to junction 97, through junction diode 98 and through the resistor 100 to ground potential. During the condition of operation when transistor 37 is conductive, the transistors 47, 57, 70 and 71 are maintained cutoff. It will further be noted that during the half cycle when transistor 127 is conductive and current flows in winding 16, the potential induced at terminal 15 is more positive than the positive supply conductor 12 and no current flows through the diode 14. During this half cycle the transistor 140 is cutoff and therefore no current can flow in the winding 17.

If the output voltage tends to continue to rise, the transistor 105 is rendered more conductive by the feedback potential and the transistors 37 and 67 are also rendered non-conductive. The current path may now be traced from the positive terminal 10 through the conductor 12 to junction 13 and through the rectifying diodes 14 and 34 to the end terminals 15 and 25 of the windings 16 and 17, respectively. This condition of operation provides the greatest number of primary winding turns and reduces the output potential by again changing the turns ratio of the transformer $T_1$.

As the output load potential tends to decrease, the conductivity of the detector transistor 105 decreases and the sequential conducting transistor circuit becomes conductive in the reverse order of that explained above whereby tap changing is effected to maintain the output voltage relatively constant. It will be obvious to those skilled in the art that a limited voltage change in the output circuit will occur in order to control the functioning of the sequential operating circuit. Although the circuit has been shown as having a primary winding with four taps it will be appreciated that the circuit may be designed with more or less taps as desired.

The transformer $T_3$ which has its end terminals connected to the emitter electrodes 126 and 137 provides a path for negative currents from the primary windings of output transformer $T_1$. The transformer $T_3$ is connected so that under normal operating conditions the center tap point 155 is always near or slightly below the positive input line 12. If the induced voltages in the primary windings 16 or 17 tends to cause the emitter of either transistor 127 or 140 to have a voltage level of more than twice the input line voltage, the voltage at center point 155 will exceed the line voltage on conductor 12 and the diode 156 will conduct. This current path is effective to shunt out any voltage transients which would otherwise damage the transistors.

*Operation of Figure 2*

The circuit of Figure 2 discloses an embodiment of the invention which in many respects is the same as Figure 1, but which has several modifications. One obvious modification is that the A.C. output potential from the transformer $T_1$ is rectified to provide a D.C. output, the circuit therefore operating as a D.C. to D.C. converter. Another modification is in the voltage feedback circuit and in the associated transistor circuitry for controlling the sequential operating transistors 37 and 47. It will be noted that the transistors 37, 47, 67, 70, 127 and 140, the transformers $T_1$ and $T_2$ are the same as disclosed above in the discussion of Figure 1 and carry the same reference numerals. The following discussion of Figure 2 will be limited primarily to the modified components shown in Figure 2 which are not present in Figure 1.

Considering now Figure 2 in greater detail, there is disclosed a conventional full wave rectifier 160 which has its input terminals energized by the output terminals 32 and 33 of the transformer secondary winding 20. The rectifier 160 has a positive output terminal 161 and a negative output terminal 162, the negative terminal 162 being directly connected by the conductor 163 to ground potential. The positive output terminal 161 is connected through a filter choke 164 and a junction 166 to an output load terminal 165. A filter capacitor 167 is connected between the junction 166 and ground. A voltage divider network comprising a resistor 170, a potentiometer 171 and a resistor 172, which are connected in series, is also connected between the junction 166 and ground. The potentiometer 171 has an adjustable wiper arm 173. The adjustable wiper arm 173 is connected by a conductor 174 to a base electrode 175 of a junction NPN transistor 176. The transistor 176 also includes a collector electrode 177 and an emitter electrode 180, the emitter electrode being connected through a junction 181 and a Zener reference diode 182 to ground potential. The emitter 180 is also connected through the junction 181 and a resistor 183 to the positive supply conductor 12. The resistor 183 and the Zener diode 182 thus form a stabilized voltage reference for the emitter electrode 180 of transistor 176.

The collector electrode 177 of transistor 176 is directly connected by a junction 184 to the base electrode 107 of the transistor 105. The emitter electrode 106 of the transistor 105 is connected by a condurtor 185, a junction 186, a conductor 187, a junction 190, a potential source 191, here shown as a battery, to the positive supply conductor 12. A resistor 192 is connected between the collector electrode 177 of the transistor 176 and the junction 186. A junction 193 between the base electrode 41 and the emitter electrode 72 of transistors 37 and 67, respectively, is connected by a resistor 194 to the conductor 187 at a junction 195. The base electrode 74 of the transistor 67 is connected through the junction 97, the diode 98, the junction 99, and the resistor 100 to ground as in Figure 1. However, the collector electrode 73 is connected by a conductor 196 to an emitter electrode 197 of a PNP transistor 200. The transistor 200 also includes a collector electrode 201 and a base electrode 202. The collector electrode 201 is connected by a load resistor 203 to ground. The base electrode 202 is connected through a current limiting resistor 204 to a junction 205 on the conductor 83 and through the resistor 84 to ground. The base electrode 202 is also connected through a resistor 206 and junction 207 to battery 191, and the base electrode 74 of transistor 67 is connected through a resistor 210 and junction 207 to battery 191. In the drawing the junction 207 is shown as being connected by a conductor 211 to the junction 195 on the conductor 187. In considering the operation of the system it will be noted that the conduction of transistor 47 is controlled by the conductivity of transistor 70. Similarily the conduction of the transistor 37 is controlled by the conductivity of the transistors 67 and 200. Further the conductivity of the transistors 67 and 70 is controlled by the transistors 176 and 105.

Let us assume initial conditions such that transistors 47 and 70 are conductive thereby connecting the positive D.C. source through the transistor 47 and the diodes 55 and 54 to the taps 30 and 23 of the transformer primary windings 17 and 16. The operation of the inverter circuit comprising transistors 127 and 140 and the transformer $T_2$ is the same as that described for Figure 1 and will not be repeated in detail here. As has been previously described, the base current from transistor 47 flows through the transistor 70 from emitter to collector and through the conductor 83, the junction 205 and the resistor 84 to ground. With transistor 70 conductive the voltage drop across the resistor 84, applied as biased through the current limiting resistor 204 to the base electrode 202 of transistor 200, when combined with the positive bias of battery 191 applied through the resistor 206, is effective to maintain the transistor 200 substantially cutoff.

Let us now assume that the rectified output potential from the transformer $T_1$ increases to a point such that the potential of the adjustable wiper 173 of potentiometer 171 becomes positive with respect to the potential existing across the Zener reference diode 182. Current will then flow from base electrode 175 to emitter electrode 180 of the transistor 176 rendering this transistor conductive. A current path may also be traced from the positive terminal of the source 191 through the junction 190, the conductor 187, the junction 186, the conductor 185, from emitter 106 to base 107 of the transistor 105, and through the transistor 176 from collector electrode 177 to the emitter electrode 180 and through the Zener diode 182 to ground. The transistor 105 is therefore also rendered conductive. As has been previously discussed as the conduction of transistor 105 increases, the voltage drop across the resistor 100 due to the current conduction of transistor 105 is effective, when the predetermined magnitude of voltage is reached, to reduce the bias to the transistor 70 such that it becomes non-conductive, while transistor 67 still remains in a conductive state.

As transistor 70 is rendered non-conductive, the voltage drop across the resistor 84 tends to reduce, thus varying the bias to the transistor 200 in a direction to initiate conduction therein. A current path may then be traced from the positive conductor 12 to junction 35, through transistor 37 from emitter 36 to base 41, through the transistor 67 from emitter 72 to conductor 73, through conductor 196, through transistor 200 from emitter 197 to collector 201 and through the resistor 203 to ground. The base current path for transistor 200 may be traced from the base electrode 202 and through the resistors 204 and 84 to ground. The resistors 208 and 209 which are connected between the positive terminal of the bias source 191 and the base electrodes 77 and 51 of transistor 70 and 47, respectively, are effective, when the transistor 70 is cutoff, to provide a back bias to these transistors to maintain the leakage currents at a minimum.

A further increase in the output potential causes increased conduction of the transistor 105 with the result that transistor 37 is also rendered non-conductive and the voltage is applied to the primary winding 16 and 17 at end terminals 15 and 25. Thus voltage regulation by tap changing is effected in the same manner as previously described for Figure 1.

*Operation of Figure 3*

Figure 3 is an embodiment of the invention which is a modification of that disclosed in Figure 2. The components which are the same as disclosed in Figures 1 and 2 carry the same reference numerals and perform the same function as described previously for these components. A detailed discussion of Figure 3 will be limited to the modified portions of the circuit. It will be noted in Figure 3 that an inverter driving transformer $T_2$ is not used, but that the transformer $T_1$ has tertiary windings 220 and 221 connected between the emitter and base electrodes of transistors 127 and 140, respectively. The voltages induced on the tertiary windings provide a regenerative feedback to the inverter transistors 127 and 140 such that they operate as a push-pull oscillator with transistor 127 conductive for one-half cycle and transistor 140 conductive for the succeeding half cycle. If desired, the core $T_1$ may be of a saturable nature or it may have a saturable section to enhance the switching action of the inverter transistors.

The junction 166 is connected by a conductor 222 to an emitter electrode 223 of a PNP transistor 224. The transistor also has a collector electrode 225 and a base electrode 226, the base electrode being connected to ground through a Zener reference diode 227. The collector electrode 225 is connected by a conductor 230 to the collector electrode 73 of the transistor 67.

The transistors 67 and 70 control the currents in transistors 37 and 47 as previously described, however, the circuitry associated with transistor 67 and 70 is modified and will be described in detail below. The transistors 67 and 70 of Figure 3 form a monostable flip-flop type circuit which has a preferred condition of operation in which transistor 70 is conductive. Specifically, the collector electrode 73 of transistor 67 is connected through the resistor 231 to ground conductor 85. Likewise the collector electrode 76 of transistor 70 is connected through a collector load resistor 232 to the ground conductor 85. Collector electrode 73 is also connected by a conductor 233 and a Zener diode 234 to the base electrode 77 of transistor 70. Likewise the collector electrode 76 is connected through a conductor 235 and a Zener diode 236 to the base electrode 74 of transistor 67. A coupling capacitor 240 is connected in parallel with the Zener diode 234, and the coupling capacitor 241 is connected in parallel with the Zener diode 236. A rectifying junction diode 242 is connected between the base electrode 77 and the emitter 75 of transistor 70 and another rectifying diode 243 is connected between the base electrode 74 and the emitter electrode 72 of transistor 67.

Considering the operation of the flip-flop circuitry when transistor 70 is conductive, a current path may be traced from the positive supply terminal 10 through the transistor 47 from emitter 46 to base 51, through the transistor 70 from emitter 75 to collector 76, and through the resistor 232 to ground. A base current path for transistor 70 may be traced from the base 77, through the Zener diode 234, through conductor 233, and resistor 231 to ground. The collector current of transistor 70 flowing through the resistor 232 causes a large potential drop thereacross so that there is insufficient potential across the Zener diode 236 to allow base current to flow in transistor 67. Transistors 67 and 37 are thus maintained cutoff when transistor 70 is conducting.

Let us now assume that the rectified output potential increases and exceeds the reference voltage of the Zener diode 227. Under these conditions the transistor 224 will conduct and allow current to flow through the transistor from emitter 223 to collector 225 through the conductors 230 and 233 thereby applying a more positive potential to the base 77 of the transistor 70. This feedback potential is effective to lower the voltage across the Zener diode 234 to a point where the diode tends to cease conducting thereby turning off transistor 70. With transistor 70 cutoff the voltage drop across 232 tends to reduce and the voltage drop now appearing across the diode 236 exceeds the Zener point allowing conduction of current through the Zener diode 236 to turn on transistors 67 and 37. With transistor 37 now conducting and transistor 47 cutoff, the turns ratio of the primary windings 16 and 17 is increased, to decrease the output voltage on winding 20. As the rectified output potential tends to decrease the conduction of transistor 224 is decreased and the flip-flop circuit can revert to its original condition of operation with transistors 70 and 47 conductive.

The capacitors 240 and 241 charge to the Zener potential of the diodes 234 and 236 and are effective to increase the snap-action of the flip-flop circuit during switching from one condition to the other. Under certain operating conditions the switching action may be rapid and continuous, the output voltage being a function of the average time on of each of the transistors 47 and 37.

*Operation of Figure 4*

The circuit disclosed in Figure 4 is a modification of the circuits of Figures 2 and 3. The elements in Figure 4 which are common to other figures carry the same identifying numerals and the detailed discussion will be limited to the newly added components. As is the case in the previous figures, the transistors 47 and 37 control the tap changing of the transformer $T_1$. The transistors 70 and 67, respectively, control the conductivity of the transistors 47 and 37. As in the embodiments of Figures 1, 2 and 3, the base electrode 51 of transistor 47 is directly connected to the emitter electrode 75 of transistor 70. The collector electrode 76 is connected by means of the resistor 232 to ground potential. Now however, the collector 76 is also connected by means of a capacitor 250 and a parallel resistor 251 to the base electrode 74 of the transistor 67. Likewise the base electrode 41 of transistor 37 is directly connected to the emitter electrode 72 of the transistor 67, and the collector electrode 73 of the transistor 67 is connected by means of the resistor 231 to ground. The collector electrode 73 is also connected by means of a capacitor 252 and a parallel resistor 253 to the base electrode 77 of the transistor 70.

The transistor 176 is connected as described in Figure 2 in which the base electrode 175 is connected to the wiper arm 173 of potentiometer 171, the emitter electrode 180 is connected to the potential reference point 181 located between the resistor 183 and the Zener diode 182. The collector electrode 177 is connected by means of a conductor 254 to the base electrode 74 of transistor 67. The base electrode 51 of transistor 47 is connected by means of a resistor 255, a junction 256 and a resistor 257 to the base electrode 41 of transistor 37. The base electrode 77 of transistor 70 is connected by means of a resistor 260 to the junction 256, and the base electrode 74 of transistor 67 is connected by means of a resistor 261 to the junction 256. The junction 256 is connected by means of a capacitor 262 through the positive supply conductor 12.

The transistors 67 and 70 operate in a flip-flop fashion, and the circuit is preferably designed so that transistor 70 is normally conductive and transistor 67 is cutoff, thus transistor 47 is conductive to maintain the turns ratio of $T_1$ such that the output voltage is at a maximum. When the voltage at the wiper arm 173 of potentiometer 171 exceeds the reference potential of the Zener diode 182 the transistor 176 is rendered conductive. Since the collector electrode 177 is directly connected to the base electrode 74 of transistor 67, it can be seen that when the transistor 176 is rendered conductive, the transistors 67 and 37 are also caused to conduct. As conduction is initiated in transistor 67, the potential change on collector 73 is fed through the capacitor 252 and the resistor 253 to the base electrode 77 of transistor 70 tending to shut off transistor 70. As the current in transistor 70 is reduced, the potential change on the collector 76 is fed through the capacitor 215 and the parallel resistor 251 to the base electrode 74 in such a direction as to increase the conduction of transistor 67. Thus it can be seen that the feedback between the two transistors is regenerative and the circuit flips from a condition with transistor 70 conductive to one in which transistor 67 is conductive. With transistors 67 and 37 conductive the input voltage is applied to the transformer primary winding terminals 23 and 30 thus changing the turns ratio to reduce the voltage on secondary winding 20. As the filtered output voltage at terminal 165 begins to decrease, the conduction of transistor 176 is reduced and the multivibrator reverts to its initial condition with transistors 70 and 47 conductive. Under certain conditions of operation the switching action may be rapid and continuous, thus rapidly switching the supply voltage from one to another taps on the primary windings of $T_1$.

I general, while I have shown certain specific embodiments of my invention, it is to be understood that this is for the purpose of illustration and that my invention is to be limited solely by the scope of the appended claims.

I claim:

1. Semiconductor voltage regulator apparatus comprising: input circuit means to be connected to a source of electrical energy; transformer means including primary winding means having terminal connections and a plurality of intermediate tap connections on said winding means, and including output winding means to be connected to load means; semiconductor current control means connected intermediate said input circuit means and the connections on said primary winding means, said semiconductor current control means comprising a plurality of semiconductor current control elements connected to be selectively biased to a conductive condition; and signal control means connected to sense the potential on said output winding and control said semiconductor current control means as a function of said output potential.

2. Semiconductor voltage regulator apparatus comprising: input circuit means to be connected to a source of electrical energy; transformer means including primary winding means having terminal connections and a plurality of intermediate tap connections on said winding means, and including output winding means to be connected to load means; semiconductor switching means comprising a plurality of semiconductor current control elements, said semiconductor switching means having a control circuit and a plurality of output circuits, said plurality of output circuits interconnecting said input circuit means and the connections on said primary winding means, said semiconductor switching means being operative to a plurality of operating conditions to selectively apply power to a desired primary winding means connection from the input circuit means; and signal control means connected to sense the potential on said output winding and control said semiconductor switching means as a function of said output potential.

3. Semiconductor voltage regulator apparatus comprising: input circuit means to be connected to a source of electrical energy; transformer means including primary winding means having terminal connections and a plurality of intermediate tap connections on said winding means, and including output winding means to be connected to load means; multistable semiconductor switching means, operable to any one of a plurality of operating conditions, connected intermediate said input circuit means and the connections on said primary winding means, said semiconductor switching means comprising a plurality of semiconductor current control elements, said semiconductor elements connected to be selectively switched to a conductive condition; and signal control means connected to sense the potential on said output winding and control the operating condition of said semiconductor switching means as a function of said output potential.

4. Semiconductor voltage regulating apparatus comprising: power input means to be connected to a source of unidirectional current; transformer means comprising output and primary winding means, said primary winding means including terminal connections and intermediate tap connections; semiconductor current control means having output circuits, an input circuit and a control circuit, said current control means being operable to any one of a plurality of conditions to selectively connect said input circuit to any one of the plurality of output circuits, said input circuit being connected to said power input means, said output circuits being connected to said connections; electrical inverter means connected to said transformer means for converting said unidirectional potential to an alternating type potential in said transformer means; and signal producing control means connected intermediate said output winding means and said control circuit for sensing the output potential and applying a signal to said control circuit for operating said current control means to a desired one of said plurality of operating conditions as a function of said output potential.

5. Semiconductor voltage regulating apparatus comprising: power input means to be connected to a source of unidirectional current; transformer means comprising output and primary winding means, said primary winding means including terminal connections and intermediate tap connections adapted to be selectively energized to vary the transformer means turns ratio; semiconductor switching means having output circuits, an input circuit and a control circuit, said switching means being operable by a suitable signal to any one of a plurality of conditions to selectively electrically connect said input circuit to any one of the plurality of output circuits, said input circuit being connected to said power input means, said output circuits being connected to said connections; electrical inverter means associated with said transformer means and said semiconductor switching means for converting said unidirectional potential to an alternating type potential; and signal producing control means connected intermediate said output winding means and said control circuit for sensing the output potential and applying a signal to said control circuit for operating said switching means to a desired one of said plurality of operating conditions and thereby control the transformer means turns ratio as a function of said output potential.

6. Semiconductor voltage regulator apparatus comprising: input circuit means to be connected to a source of electrical energy; transformer means including output winding means to be connected to load means and including primary winding means having a plurality of tap connections thereon for allowing selection of a desired turns ratio; semiconductor switching means comprising a plurality of semiconductor current control elements, said semiconductor switching means having a control circuit and a plurality of output circuits, said plurality of output circuits interconnecting said input circuit means and the connections on said primary winding means, said semiconductor switching means being operative to any one of a plurality of operating conditions to selectively apply power to a desired primary winding means connection from the input circuit means; and signal control means connected to sense the potential on said output winding and control said semiconductor switching means and thereby said transformer turns ratio as a function of said output potential.

7. Semiconductor voltage regulator apparatus comprising: input circuit means to be connected to a source of electrical energy; transformer means including output winding means to be connected to load means and including primary winding means having a plurality of spaced tap connections on said winding means to provide for varying the transformer means turns ratio; multistable semiconductor switching means operable to any one of a plurality of operating conditions connected intermediate said input circuit means and the spaced connections on said primary winding means, said semiconductor switching means comprising a plurality of semiconductor current control elements, said separate elements being in circuit with said tap connections said semiconductor elements connected to be selectively switched to a conductive condition and thereby control the effective turns ratio of said transformer means; and signal control means connected to sense the potential on said output winding and control the operating condition of said semiconductor switching means as a function of said output potential.

8. Semiconductor voltage regulating apparatus comprising: power input means to be connected to a source of unidirectional current; transformer means comprising output and primary winding means, said primary winding means including a plurality of spaced tap connections for providing a controllable turns ratio between said output and primary windings; semiconductor switching means having output circuits, an input circuit and a control circuit, said switching means being operable to any one of a plurality of conditions to selectively electrically connect said input circuit to any one of a plurality of output circuits, said input circuit being connected to said power input means, said plurality of output circuits being connected, respectively, to said plurality of spaced tap connections; electrical inverter means connected to said transformer means for converting said unidirectional potential to an alternating type potential in said transformer means; and signal producing control means connected intermediate said output winding means and said control circuit for sensing the output potential and applying a signal to said control circuit for operating said switching means to a desired one of said plurality of operating conditions and thereby control the effective turns ratio of said transformer means as a function of said output potential.

9. Semiconductor voltage regulator apparatus comprising: power input circuit means to be connected to a source of electrical energy; transformer means including output winding means to be connected to load means, and including primary winding means having a plurality of spaced connections; current switching means comprising a plurality of semiconductor amplifying means, each having a plurality of electrodes including output electrodes and a control electrode; first circuit means connecting one of the output electrodes of each of said semiconductor means to said input circuit means; further circuit means connecting the other output electrode of each of said semiconductor means, respectively, to a separate one of said tap connections; biasing means connected to the control electrodes of said semiconductor means to provide sequential operation of said semiconductor amplifying means; and signal producing control means connected from said output winding means to said bias means for sensing the output potential and applying a signal through said biasing means to said control electrodes for operating said switching means such that a desired one of said plurality of semiconductor amplifying means is conductive as a function of the magnitude of said output potential.

10. Semiconductor voltage regulator apparatus comprising: input circuit means to be connected to a source of electrical energy; transformer means including output winding means to be connected to load means, and including primary winding means having a plurality of tap connections thereon for allowing selection of a desired turns ratio; semiconductor current control means substantially operable to a plurality of conductive conditions comprising a plurality of semiconductor amplifying devices, each of said devices having a control electrode and output electrodes; means connecting a first output electrode of each of said devices to said input circuit means; further circuit means connecting the other output electrode of said plurality of devices, respectively, to said spaced tap connections; and signal producing control means connecting from said output winding means to said control electrodes to sense the potential on said output winding means and selectively control said semiconductor current control means and thereby said transformer turns ratio as a function of said output potential.

11. Semiconductor voltage regulator apparatus comprising: power input means to be connected to a source of electrical energy; transformer means including output winding means and primary winding means, at least one of said winding means having a plurality of spaced tap connections thereon for allowing selection of a desired transformer means turns ratio; semiconductor switching means comprising a plurality of semiconductor amplifying devices each having a plurality of electrodes including a control electrode and output electrodes, said semiconductor switching means being selectively operable to render any one of said plurality of devices conductive; means connecting the output electrodes of said plurality of semiconductor devices, respectively, in circuit with said plurality of spaced tap connections, means connecting said semiconductor switching means to said control electrode of said devices so as to render any of said plurality of devices conductive, and signal producing control means connected to sense the output potential and control said semiconductor switching means so that said transformer means turns ratio is varied as a function of said output potential.

12. Semiconductor voltage regulator apparatus comprising: power input means to be connected to a source of electrical energy; output means; transformer means including primary winding means and output winding means, one of said winding means having a plurality of spaced tap connections thereon; first circuit means connecting said transformer means between said power input means and said output means, said first circuit means including semiconductor switching means, said semiconductor switching means comprising a plurality of semiconductor amplifying devices connected such that any one may be selectively switched to a conductive condition, said plurality of semiconductor devices being connected to said plurality of spaced tap connections; and signal producing control means connected to sense the potential supply to said output means and providing a signal to said semiconductor switching means and control said semiconductor switching means as a function of said output potential.

13. Semiconductor voltage regulator apparatus comprising: power input means to be connected to a source of unidirectional current; transformer means comprising output and primary winding means, said primary winding means having a plurality of connections including a terminal connection and at least first and second spaced tap connections; semiconductor switching means comprising a plurality of semiconductor amplifying devices, each of said devices having a plurality of electrodes including a control electrode, an input electrode and an output electrode; means connecting said input electrodes to said power input means; means connecting the output electrode of a first of said plurality of devices to a first of said spaced tap connections, and connecting the output electrode of a second of said devices to another of said spaced tap connections, said switching means being operable to any one of a plurality of conditions to selectively electrically connect said power input means to the desired tap connection through the corresponding semiconductor device; electrical inverter means connected to said transformer means for converting said unidirectional potential to an alternating type potential in said transformer means; and signal producing control means connected intermediate said output winding means and said control electrodes for sensing the output potential and applying a signal to said control electrode for operating said switching means to a desired one of said plurality of operating conditions so as to control the effective turns ratio of said transformer means as a function of said output potential.

14. Semiconductor voltage regulator apparatus comprising: power input means to be connected to a source of electrical energy; transformer means comprising output and primary winding means, said primary winding means having a plurality of connections thereto including a terminal connection and at least first and second spaced tap connections; semiconductor switching means comprising a plurality of semiconductor amplifying devices, each of said devices having a plurality of electrodes including a control electrode, an input electrode and an output electrode; means connecting said input electrodes to said power input means; means connecting the output electrode of a first of said plurality of devices to a first of said spaced tap connections, and connecting the output electrode of a second of said devices to another of said spaced tap connections, said switching means being operable to render any one of said plurality of devices conductive to selectively electrically connect said power input means to the desired tap connection through the conductive semiconductor device; and signal producing control means connected intermediate said output winding means and said control electrodes for sensing the output potential and applying a signal to said control electrodes for operating said switching means to render the desired one of said devices conductive so as to control the effective turns of said transformer means as a function of said output potential.

References Cited in the file of this patent

UNITED STATES PATENTS

| | | |
|---|---|---|
| 2,504,017 | George et al. | Apr. 11, 1950 |
| 2,832,928 | Arnold et al. | Apr. 29, 1958 |